United States Patent [19]
Hiben et al.

[11] Patent Number: 5,483,673
[45] Date of Patent: Jan. 9, 1996

[54] METHOD AND APPARATUS FOR PROVIDING ACCESS TO A COMMUNICATION SYSTEM

[76] Inventors: Bradley M. Hiben, 437 Hill Ave., Glen Ellyn, Ill. 60137; Donald G. Newberg, 2620 College Hill Cir., Schaumburg, Ill. 60173; Robert D. LoGalbo, 962 Tallgrass Dr., Bartlett, Ill. 60103

[21] Appl. No.: 153,403

[22] Filed: Nov. 17, 1993

[51] Int. Cl.⁶ ................................................. H04B 7/00
[52] U.S. Cl. ...................... 455/54.2; 455/34.2; 455/56.1; 455/33.1
[58] Field of Search .................. 455/34.1, 34.2, 455/33.1, 56.1, 54.1, 54.2, 67.1, 49.1, 58.2; 379/59, 63

[56] References Cited

U.S. PATENT DOCUMENTS

| | | | |
|---|---|---|---|
| 4,012,597 | 3/1977 | Lynk, Jr. et al. | 455/54.2 |
| 4,723,264 | 2/1988 | Sasuta et al. | 379/59 |
| 5,054,109 | 10/1991 | Blackburn | 455/54.2 |
| 5,101,502 | 3/1992 | Felderman et al. | 455/34.1 |
| 5,179,720 | 1/1993 | Grube et al. | 455/34.1 |
| 5,235,598 | 8/1993 | Sasuta | 455/34.1 |
| 5,239,678 | 8/1993 | Grube et al. | 455/34.1 |
| 5,287,552 | 2/1994 | Sasuta et al. | 455/54.2 |

*Primary Examiner*—Reinhard J. Eisenzopf
*Assistant Examiner*—Doris To
*Attorney, Agent, or Firm*—Christopher P. Moreno

[57] ABSTRACT

Communication units are provided access to a communication system (100) in the following manner. A base station (202) receives, from a requesting communication unit, a request, via a shared inbound communication resource (209), for an available message path (207). When a dual-mode outbound communication resource is operating in a control mode (205), the message path (207), having a first inbound communication resource (204) and the dual-mode outbound communication resource operating in a partial control mode (206), is assigned to the requesting communication unit. Thus, the shared inbound communication resource is consistently available, providing access to the communication system.

9 Claims, 2 Drawing Sheets

METHOD AND APPARATUS FOR PROVIDING ACCESS TO A COMMUNICATION SYSTEM

FIELD OF THE INVENTION

The present invention relates generally to communication systems and, in particular, to a method and apparatus for providing communication units access to a communication system.

BACKGROUND OF THE INVENTION

Communication systems are known to comprise a plurality of communication units, such as vehicle-mounted mobile or hand-held portable radios, and a limited number of communication resources that are transceived by at least one base station. For example, trunked communication systems operate by sharing the limited number of communication resources, which may be pairs of radio frequencies, among the plurality of communication units over a large coverage area. Typically, the large coverage area includes several sites (geographic areas in which communications coverage is provided by a base station or set of base stations), each site covering only a portion of the large coverage area. By dedicating one channel within each site of the trunked communication system as a control channel, a central controller is able to dynamically allocate the remaining channels, often called voice channels, so that multiple intragroup or dispatcher-to-group communications may take place concurrently. Such systems are useful to entities accommodating a large number of communication units, such as delivery or utility services, which require a large, but limited, coverage area.

It is often the case that sites within a trunked communication system have varying user densities. The user density of a site can be defined as the average number of communication units operating within the site at any given time. Thus, high-density sites typically require a larger number of communication resources and base stations to meet user needs. Likewise, in a low-density site, i.e., a site typically having a relatively small number of operating communication units, there is a lesser need for multiple communication resources and base stations. Indeed, it is not uncommon to find two-channel sites having only a control channel and a single voice channel. Low-density sites are generally not cost-effective in that they relatively infrequently—as compared to high-density sites—utilize their dedicated infrastructure and spectrum resources. The inefficiency of low-density sites often proves to be a financial burden to trunked communication system users and a competitive disadvantage to trunked communication system manufacturers.

A simple solution to this situation is to simply exclude low-density sites from a trunked communication system. That is, any site not having a sufficiently high user density is eliminated at the cost of reduced overall coverage area. This is an inadequate solution for systems requiring a large number of low-density sites. For example, public safety and/or utility organizations providing services to predominantly rural areas typically do not have high user densities. Nevertheless, the services that such organizations provide are often crucial, and provision of these services can be hampered by reduced overall coverage area.

Another solution is the use of a control channel capable of converting to voice channel operation when necessary. This is particularly useful in low-density sites since a single channel can be used to provide coverage, thus reducing the need for costly infrastructure and spectrum resources. A potential disadvantage of this solution is that once the control channel has been assigned as a voice channel, services typically provided by the control channel, such as emergency requests and call queuing requests, are no longer available. This presents a potentially critical, and often unacceptable, reduction in services. Therefore, a need exists for a method that provides communication units with access to a trunked communication system, particularly in low-density sites, without the need for increased infrastructure and spectrum resources.

DESCRIPTION OF A PREFERRED EMBODIMENT

The present invention encompasses a method and apparatus for providing, to a communication unit, access to a trunked communication system. This is achieved through the use of a base station employing a first and a second inbound communication resource, as well as a dual-mode outbound communication resource. A request for an available communication path is received, from a communication unit, on the second inbound communication resource by the base station. The second inbound communication resource is shared by all sites within the trunked communication system. If the dual-mode outbound communication resource is operating in a control mode, a message path—consisting of the first inbound communication resource and the dual-mode outbound communication resource, operating in a partial control mode—is assigned to the communication unit for use in a communication. In the context of the present invention, a message can include voice and/or data (e.g., a text file) information. With such a method, communication units may access low-density areas of a trunked communication system without the need for increased infrastructure and/or spectrum resources.

Figure 1:
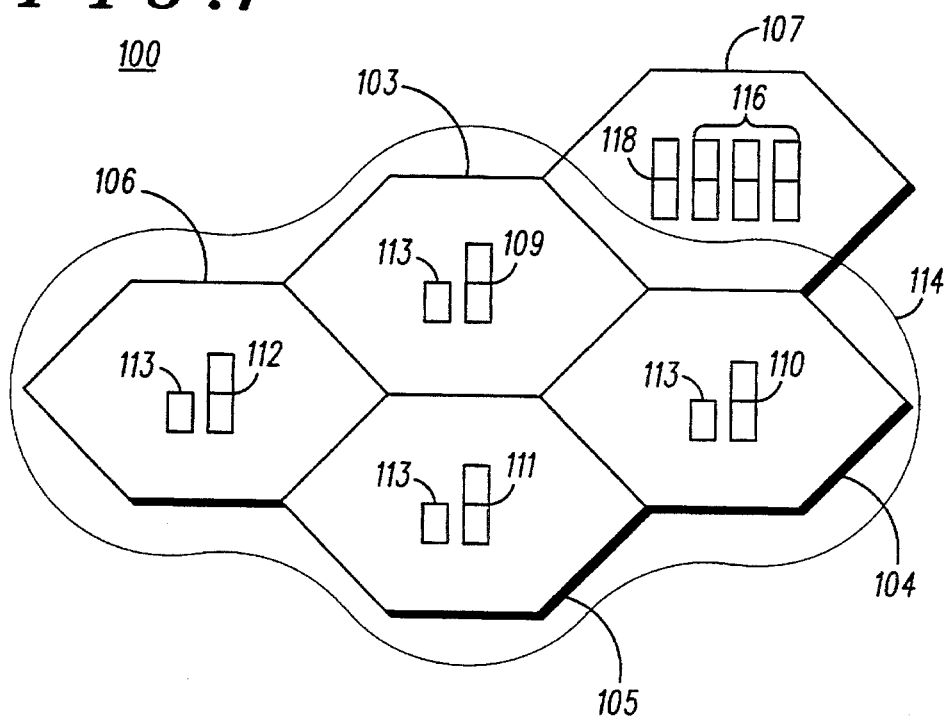
FIG. 1 illustrates a multi-site, trunked communication system in accordance with the present invention.

The present invention can be more fully described with reference to FIG'S. 1–3. FIG. 1 illustrates a multi-site, trunked communication system (100) that includes low-density sites (103–106) and a high-density site (107). The high-density site (107) includes multiple fixed transmitter/receiver pairs (116, 118). Each fixed transmitter/receiver pair (116, 118) may be a base station capable of trunked operation, for example an MSF5000 base station manufactured by Motorola, Inc. Note that in the high density site (107) there is a sufficient number of transmitter/receiver pairs (116, 118) to dedicate a transmitter/receiver pair (118) as a control channel.

Within each low density site (103–106), there is a fixed transmitter/receiver pair (109–112) and a fixed receiver (113). Similar to the high-density site configuration, the fixed transmitter/receiver pair (109–112) and the fixed receiver (113) within each low-density site (103–106) may comprise an MSF5000 base station with an additional receiver option.

The fixed transmitter/receiver pairs (109–112) operating within the low-density sites (103–106) are used for simultaneous inbound and outbound message communications, and/or outbound control signaling with communication units, such as vehicle-mounted mobile or hand-held portable radios. To this end, the receiver portion of each transmitter/ receiver pair (109–112) employs a first inbound communication resource and the transmitter portion of each transmitter/receiver pair (109–112) employs a dual-mode outbound communication resource. These communication resources may be radio frequency (RF) carriers, time division multiplex (TDM) slots, or any other RF transmission media. A unique pair of first inbound and dual-mode outbound communication resources are used at each site (103–106) so that interference will not occur between simultaneous transmissions in adjacent sites. Also, a cellular reuse pattern might be employed so that communication resources are concurrently used in sites sufficiently separated from each other.

The fixed receivers (113) are used for inbound signaling from communication units operating within each low-density site (103–106). To this end, the fixed receivers (113) employ a second inbound communication resource. The same second inbound communication resource (e.g., an identical RF carrier frequency) is used by each fixed receiver (113) in the low-density sites (103–106), thus giving rise to a larger inbound control coverage area (114). In this manner, a dedicated inbound signaling path is provided throughout the low-density sites (103–106) using only the second, less costly, inbound communication resource (113).

Although not shown, it is assumed that a fixed communication network, including a system controller such as a Smartzone® controller by Motorola, Inc., is used to connect each of the sites (103–107) with each other. Thus, control information received by the fixed receivers (113), in the low-density sites (103–106), and the fixed transmitter/receiver pair (118), in the high-density site (107), is shared with the system controller.

As noted above, the dual-mode outbound communication resource at the low-density sites (103–106) is used for message communications and control signaling. This is in contrast to the high-density site (107) where communication resources are dedicated to message communications or to control signaling, but not both. In a preferred embodiment, the dual-mode outbound communication resource, operating in a control mode, serves as a high speed, digital communication resource for control signaling only; in a partial control mode, it serves as a high speed, digital communication resource for message communications with a small amount of capacity reserved for low speed control signaling.

In the control mode, the dual-mode outbound communication resource is used to quickly assign a message path, comprising the first inbound communication resource and the dual-mode outbound communication resource, when a communication unit's request for service is received. After the assignment is complete, the dual-mode outbound communication resource operates in the partial control mode as part of the message path until the requested message communication is complete. While in the partial control mode, the dual-mode outbound communication resource can be used to acknowledge the queuing, or reassignment to a nearby site, of subsequent call requests. Assuming a digital system, control signaling transmitted via the dual-mode outbound communication resource in the partial control mode can be time division multiplexed with the message information. In analog systems, the control information can be transmitted using sub-band signaling. Operation of the system (100) can be more fully described with reference to the operation of a particular low-density site (e.g., 103–106).

Figure 2:
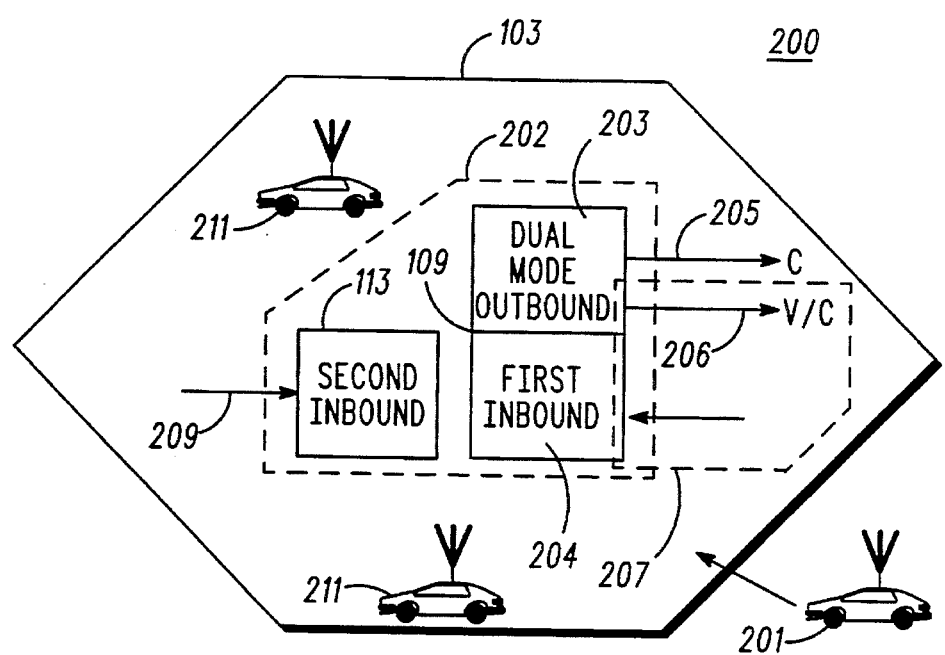
FIG. 2 illustrates a low-density site in accordance with the present invention.

FIG. 2 illustrates a communication arrangement (200) that includes a low-density site (e.g., site 103 shown in FIG. 1), and a roaming communication unit (201) preparing to enter the low-density site (103). The roaming communication unit (201) may transmit a request, via a second inbound communication resource (209), to a base station (202), to use a message path (207). In a preferred embodiment of the present invention, the base station (202) includes the fixed transmitter/receiver pair (109), which employs a dual-mode outbound communication resource (203) and a first inbound communication resource (204), while the fixed receiver (113) employs a shared inbound communication resource. As previously discussed, the dual-mode outbound communication resource (203) can operate in a control mode (205) or as part of a message path (207)—i.e., in conjunction with the first inbound communication resource (204)—while in a partial control mode (206).

As the roaming communication unit (201) moves about the communication system (100), it travels between the various high and low-density sites (103–107). Upon initialization (e.g., power-up), the roaming communication unit (201) evaluates signal quality of the dual-mode outbound communication resource from each of the various low-density sites (103–106), as well as the dedicated control channel in the high-density site (107). When there is no specific control information to be sent, unique site identifications (IDs), embedded in the outbound communication resources being evaluated, are continuously transmitted. Through the continuous reception of site IDs, communication units are able to measure signal quality received from each site (103–107). Received signal strength indications (RSSI), and bit error rates (BER) are examples of suitable signal quality measures.

After evaluation, the roaming communication unit (201) affiliates with the site having the best signal quality. If trying to affiliate with a low-density site (103–106), an affiliation request, containing the appropriate site ID number, is transmitted on the second inbound communication resource (209). If trying to affiliate with the high-density site (107), the affiliation request is transmitted on the dedicated control communication resource. Once affiliation is complete, a system controller (not shown) can direct message communications involving the roaming communication unit (201) to the proper site (103–107).

If the roaming communication unit (201) desires to transmit a message while operating within the low-density site (200), a call request is transmitted to a fixed receiver (113), via the second inbound communication resource (209). [It should be noted that while it is preferable that the fixed receiver (113) associated with the affiliated site receives the call request, the call request may be received by other fixed receivers (113) at other low-density sites (103–106). The receiving site (103–106) would then forward the call request to the system controller.] Since many sites are using the same second inbound communication resource (209), it is possible that call requests from multiple communication units will occasionally "collide". This is handled by the multiple access protocol just as in most multiple access systems, although an advantage of the present invention is that a call request need only be received accurately by one fixed receiver (113). A multiple access protocol such as ALOHA or Carrier Sense Multiple Access (CSMA) may be used for the second inbound communication resource (209). Since the communication unit is affiliated with a particular site, the call request need not be received accurately at the affiliated site; the affiliation is sufficient to determine the site from which the call request is being made. Thus, the probability of a call request being missed is reduced since several receivers have the opportunity to receive the request.

Once a call request has been transmitted by the roaming communication unit, the base station (202) must at least acknowledge receipt of the request. In a preferred embodiment, the acknowledgment can assign the message path, if it is available, to the requesting communication unit, or it can indicate that the request has been queued until the message path becomes available. Additionally, if the call request is an emergency or priority call, the base station (202) might override ongoing communications and assign the message path to the requesting communication unit. For example, if other communication units (211) are currently engaged in a communication and the roaming communication unit (201) transmits a priority call request via the second inbound communication resource (209), the message path (207) is reassigned to the roaming communication unit (201) and the other communication units (211) are informed of the reassignment. The ability of the present invention to receive inbound priority/emergency call requests, via the second inbound communication resource (209), is a distinct advantage over prior art systems that utilize a single control-only/voice-only channel.

Figure 3:
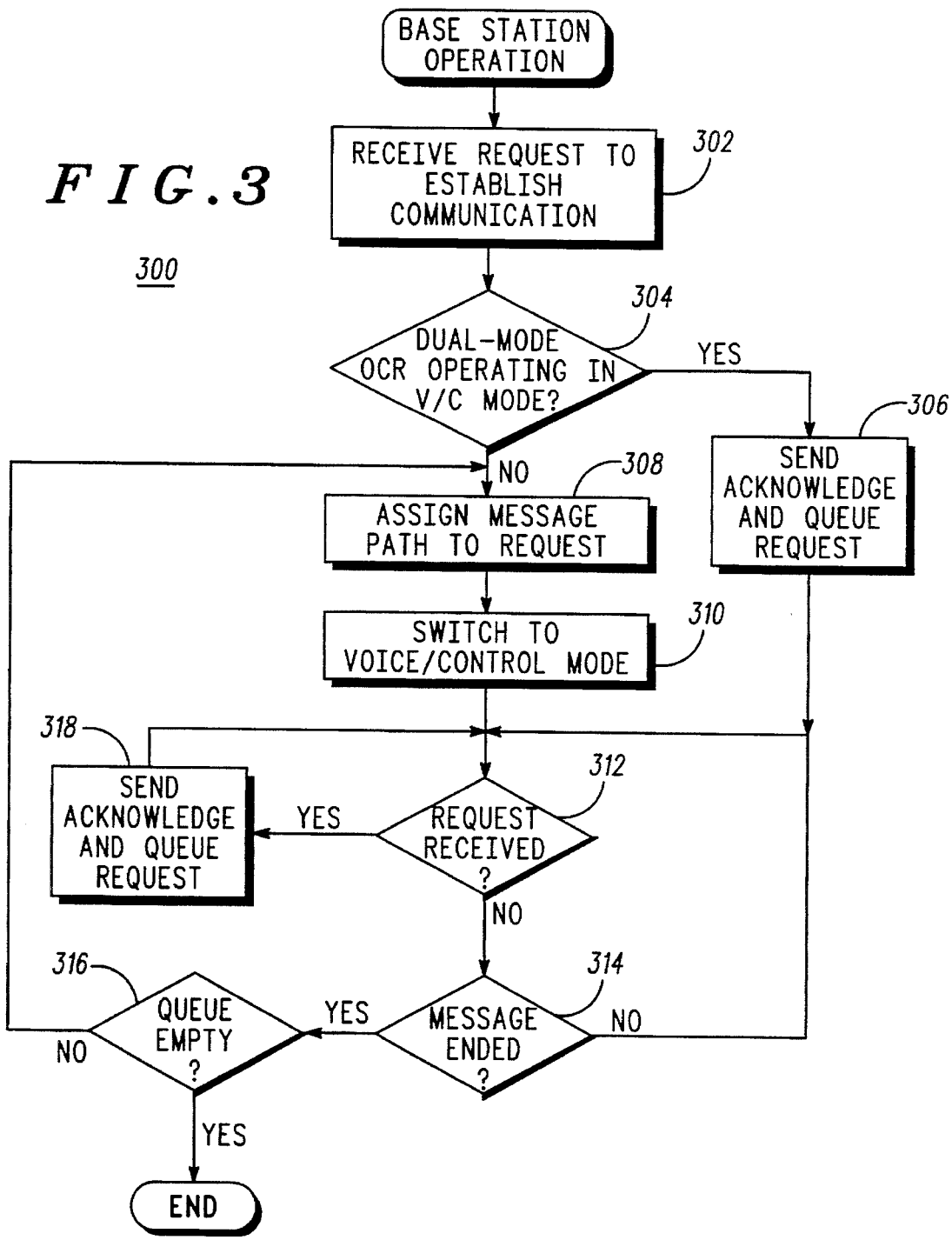
FIG. 3 illustrates a logic diagram that a base station, operating in a low-density site, may incorporate to implement the present invention.

FIG. 3 illustrates a logic diagram of a preferred embodiment that a base station, operating in a low-density site, might incorporate to implement the present invention. At step 302, a request is received, via the second inbound communication resource, to establish a communication. To this end, it is determined (304) if the dual-mode outbound communication resource is operating in the voice/control mode. This determination is made by examining a status flag, which may be stored in memory, used to track the operating status of the dual-mode outbound communication resource. If the dual-mode outbound communication resource is currently in the partial control mode, the message path cannot be assigned to the requesting communication unit. Hence, the call request is acknowledged (306) using the limited outbound control signaling path described above, and the call request is queued—e.g., in a call request queue—for future assignment (306). If, however, the dual-mode outbound communication resource is operating in the control mode, the message path is assigned (308) to the requester, and the dual-mode outbound communication resource is switched (310) for operation in the partial control mode.

Proceeding from either step 306 or 310, it is determined (312) if additional call requests have been received. If a call request has been received, the call request is acknowledged and queued (318). If a request has not been received, a test is performed (314) to determine whether the current message has ended, thus making the message path available. The end of the current message is determined by an end-of-message (EOM) indication transmitted by the communication unit or the system controller. If the current message has not ended, processing continues as before at step 312. If the current message has ended, the dual-mode outbound communication resource reverts to the control mode, and it is determined (316) whether or not the call request queue is empty. If the call request queue is empty, no call requests are pending and the routine is exited. If the call request queue has pending call requests, the first call in the queue is removed from the call request queue and assigned (308) the message path. This procedure continues until all queued call requests are processed.

It should be noted that there are alternatives to the use of call queuing described above. For example, a call request can be assigned by the system controller to a nearby low-density site that is not currently busy with message traffic. The signal quality of the received call request can be used to direct the assignment to a site having sufficient signal quality. This method can increase the speed at which calls are assigned.

The present invention furnishes a method and apparatus for providing a communication unit with access to a trunked communication system. Using such a method, the need for a dedicated control channel at each low-density site is substantially eliminated. Furthermore, the loss of a control channel—due to voice assignment—in single channel sites is also substantially mitigated. This is accomplished through the use of a base station having a second, fixed receiver, employing a second inbound communication resource, constantly available for inbound control signaling. Also, outbound control signaling is consistently available through the use of a dual-mode outbound communication resource.

What is claimed is:

1. In a base station that provides communication services to a plurality of communication units, the base station employing a first inbound communication resource, a second inbound communication resource, and a dual-mode outbound communication resource, a method of providing access to a communication system for the plurality of communication units, the method comprising the steps of:

A) receiving, on the second inbound communication resource from a requesting communication unit of the plurality of communication units, a request for an available message path;

B) when the dual-mode outbound communication resource is operating in a control mode, assigning a message path to at least the requesting communication unit, wherein the message path includes the first inbound communication resource and the dual-mode outbound communication resource operating in a partial control mode; and C) establishing, responsive to the step of assigning, a communication between the requesting communication unit and a second communication unit of the plurality of communication units, using the message path.

2. The method of claim 1 further comprising the step of:

D) when the dual-mode outbound communication resource is operating in the partial control mode, transmitting a call acknowledgment to the requesting communication unit via the dual-mode outbound communication resource.

3. The method of claim 2 further comprising the step of:

E) when the dual-mode outbound communication resource is operating in the partial control mode, queuing the request.

4. The method of claim 1 further comprising the step of:

D) receiving, via the second inbound communication resource, a priority call from any one of the plurality of communication units while the dual-mode outbound communication resource is operating in the partial control mode; and E) overriding the communication to service the priority call.

5. In a multiple site radio communication system that includes a base station for each of a plurality of communication sites and for providing communication services to a plurality of communication units, each base station employing a second inbound communication resource and a message path that includes a first inbound communication resource and a dual-mode outbound communication resource, a method of providing access to the communication system for the plurality of communication units, the method comprising the steps of:

at a first communication unit of the plurality of communication units;

A) identifying, using the dual-mode outbound communication resource, one of the plurality of communication sites as an affiliated communication site;

B) transmitting, via the second inbound communication resource, a request to use the message path corresponding to the affiliated communication site;

C) when the dual-mode outbound communication resource corresponding to the affiliated communication site is operating in a control mode, receiving an assignment for the message path; and D) communicating a message, responsive to the step of receiving, to a second communication unit of the plurality of communication units.

6. The method of claim 5 further comprising the step of:

E) when the dual-mode outbound communication resource corresponding to the affiliated communication site is operating in a partial control mode, receiving, from the base station at the affiliated communication site, a call acknowledgment via the dual-mode outbound communication resource.

7. The method of claim 5 further comprising the step of:

at a base station for the affiliated communication site;

E) when the dual-mode outbound communication resource corresponding to the affiliated communication site is operating in a partial control mode, queuing the request.

8. The method of claim 5 further comprising the step of:

E) transmitting, from a third communication unit of the plurality of communication units via the second inbound communication resource, a priority call while the dual-mode outbound communication resource is operating in a partial control mode.

9. A base station comprising:

a dual-mode transmitter that transmits outbound information to a plurality of communication units, wherein the outbound information comprises control information when the dual-mode transmitter operates in a control mode, and wherein the outbound information comprises control and outbound message information when the dual-mode transmitter operates in a partial control mode;

a first inbound communication resource, operably coupled to the dual-mode transmitter, that receives inbound message information from the plurality of communication units; and a second inbound communication resource, operably coupled to the dual-mode transmitter, that receives control information from the plurality of communication units.

* * * * *